Figure 1:
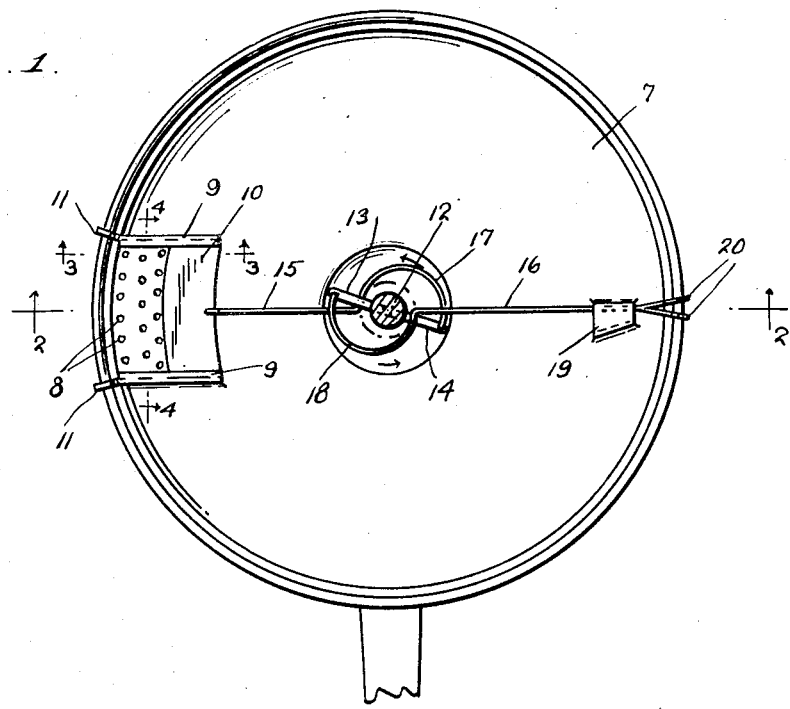

Feb. 13, 1934.   B. H. AUPKE   1,947,149

LID AND RETAINING MEANS THEREFOR

Filed Oct. 21, 1932

Inventor

B. H. Aupke

By Clarence A. O'Brien
Attorney

Patented Feb. 13, 1934

1,947,149

UNITED STATES PATENT OFFICE 1,947,149

LID AND RETAINING MEANS THEREFOR

Benjamin H. Aupke, Pittsburgh, Pa.

Application October 21, 1932. Serial No. 638,952

3 Claims. (Cl. 53—8)

This invention relates to the broad class of cooking utensils and has more specific reference to a novel lid or cover for various types of pots, pans, and similar food cooking vessels.

The principal novelty is predicated upon a unique style or form of cover which, though conventional in general aspects, is supplemented by the provision thereon of simple and practicable retaining means for positively and temporarily maintaining the cover against accidental displacement when the vessel is tilted or inverted to drain liquid therefrom.

It is a matter of common knowledge to those skilled in the art to which the invention relates that utensil lids and covers of the variety herein illustrated are generally provided with vent holes to permit the escape of steam, together with a movable closure therefor, said closure being generally closed while the contents of the vessel is cooking, and opened, whenever necessary or desired to allow the venting of steam, and pouring of liquid from the vessel preparatory to emptying the contents into a suitable table receptacle. This practice is primarily objectionable in that it frequently permits unskilled hands, not accustomed to this task, to become injured by scalding, or burning from rapidly escaping steam.

I am aware of the fact that it is not broadly new in this particular line of endeavor to provide supplementary locking or retaining means for lids to facilitate this particular step in the handling of cooked food.

The present improvement is predicated upon simple, dependable, and positive means which is especially constructed to serve not only as a lid retainer, but as means for simultaneously actuating the vent hole closure.

Other features and advantages of the invention will become more readily apparent from the following description and drawing.

In the drawing:

Figure 1 is a top plan view of the structure as developed in accordance with the principles of the present invention showing the retaining means in its fastening position, with the vent closure moved to open position.

Figure 2:
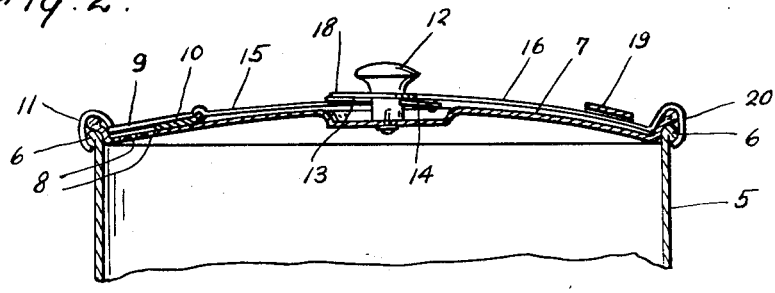
Figures 3, 4:
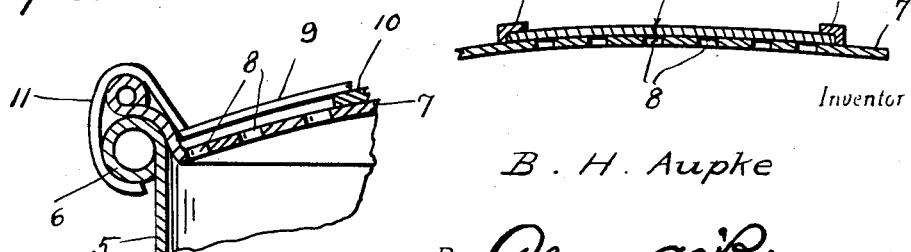

Figures 2, 3, and 4 are enlarged sectional views taken on the planes of the lines 2—2, 3—3, and 4—4, respectively, of Figure 1.

In the drawing, in Figure 2, the numeral 5 designates a conventional vessel or pan which, as shown in Figure 3 is provided with the customary rim bead 6. The cover, which is conventional in configuration, is distinguished by the numeral 7. As is usual, it is provided at a predetermined point with a plurality of apertures forming steam venting ports 8. In accordance with the present invention, I provide a pair of integral guide tracks 9 disposed in close proximity to this ensemble of ports or apertures 8. These guides, which may be welded or otherwise formed integral by stamping, constitute accommodation tracks for a sliding cover or shield 10. This is in the form of a plate of appropriate proportions. In connection with the guides I call attention to a pair of suitably shaped hooks 11 which engage over the adjacent portion of the bead 6 as shown in Figures 2 and 3.

I next call attention to the numeral 12 which designates a turnable or rotary knob swivelly attached to the central depressed portion of the cover. In accordance with the present invention, this is provided with diametrically opposed operating arms 13 and 14. These arms turn with the knob. The arms 13 and 14 serve to accommodate the diametrically opposed actuating rods 15 and 16. The rod 15 is in the nature of a link, being attached at one end to the slidable closure 10 and having its opposite longitudinally bowed end 17 pivotally attached to the arm 14. The rod 16 has a similar curved inner end 18 attached pivotally to the arm 13, said rod extending out through and beyond a fixed guide where it terminates in a pair of companion hooks 20 to engage over the portion of the bead 6 diametrically opposite to the hooks 11. The features 13, 14, 17, and 18 are so shaped as to permit the features 13 and 14 to assume a position beyond "dead center" when the structure is in its effective state. This arrangement renders the rods 15 and 16 extensible and retractible and when said rods are retracted, the hooks 20 are bound tightly against the bead 6 and the closure plate 10 is slid to an open position, this being accomplished simultaneously. Thus, the cooperation of the hooks 20 together with the fixed hooks 11 serves to firmly fasten the lid on the pan so that it can be inverted with one hand to empty the liquid without permitting the load or contents to be accidentally dumped.

The gist of the invention is found in the provision of a vented lid having associated guides to accommodate a relatively slidable closure plate for the vents; together with a turnable central knob and a pair of diametrically opposed rods operatively attached thereto, one of said rods functioning as a link to slide the plate back and forth and the other rod terminating in hooks to engage over the rim of the pan so as to render both sets of hooks (11 and 20) effective for locking the cover in position while draining liquid therefrom. By thus firmly fastening the cover in place at this particular stage in the cooking operation, it is evident that the hands of the operator need not be placed near the discharging steam jets. Hence, there is no liability of scalding or burning. Particular stress, however, is placed upon the expansible and retractible action of the parts 15 and 16 wherein the part 16 serves to operate the hooks 20 and the part 15 functions as a link to simultaneously move the closure 10 to a position to uncover the vents 8 to systematize the operation. As before pointed out, the invention is characterized by simplicity and economy and, it is believed, constitutes a novel contribution to the trade and the art.

It is thought that persons skilled in the art to which the invention relates will be able to obtain a clear understanding of the invention after considering the description in connection with the drawing. Therefore, a more lengthy description is regarded as unnecessary.

Minor changes in shape, size, and rearrangement of details coming within the field of invention claimed may be resorted to in actual practice, if desired.

What is claimed is:

1. As a new product of manufacture, a cooking utensil lid provided with a rotary knob, further provided with a group of steam venting and draining holes, a pair of spaced parallel rigid guide tracks associated with said holes, said tracks being formed at their outer ends with rigid hooks adapted to engage over the rim of the utensil, a closure plate slidable in said guide tracks and adapted to cover said holes, a link attached to said plate, and an operating connection between the inner end of the link and said knob.

2. As a new product of manufacture, a cooking utensil lid provided with a rotary knob, further provided with a group of steam venting and draining holes, a pair of spaced parallel rigid guide tracks associated with said holes, said tracks being formed at their outer ends with rigid hooks adapted to engage over the rim of the utensil, a closure plate slidable in said guide tracks, and adapted to cover said holes, a link attached to said plate, and an operating connection between the inner end of the link and said knob, a rod disposed opposite said link, a guide on the lid for said rod, an operating connection between the inner end of the rod and knob, said rod being formed on its outer end with hooks located opposite the first named hook and adapted to engage over the adjacent portion of the rim of the utensil.

3. As a new product of manufacture, a cooking utensil lid provided with an opening, means for closing the opening, means for locking the lid on a utensil, and means actuatable simultaneously to operate the means for closing the opening and releasing the means for locking the lid on a utensil.

BENJAMIN H. AUPKE.